Dec. 6, 1966

C. O. LOFGREN ET AL 3,289,228

SCREW HEAD SLOTTING APPARATUS

Filed Oct. 19, 1965

Inventors.
Charles O. Lofgren.
Axel Anderson.
By. Hofgren, Wegner, Allen,
Stellman & McCord Attorneys.

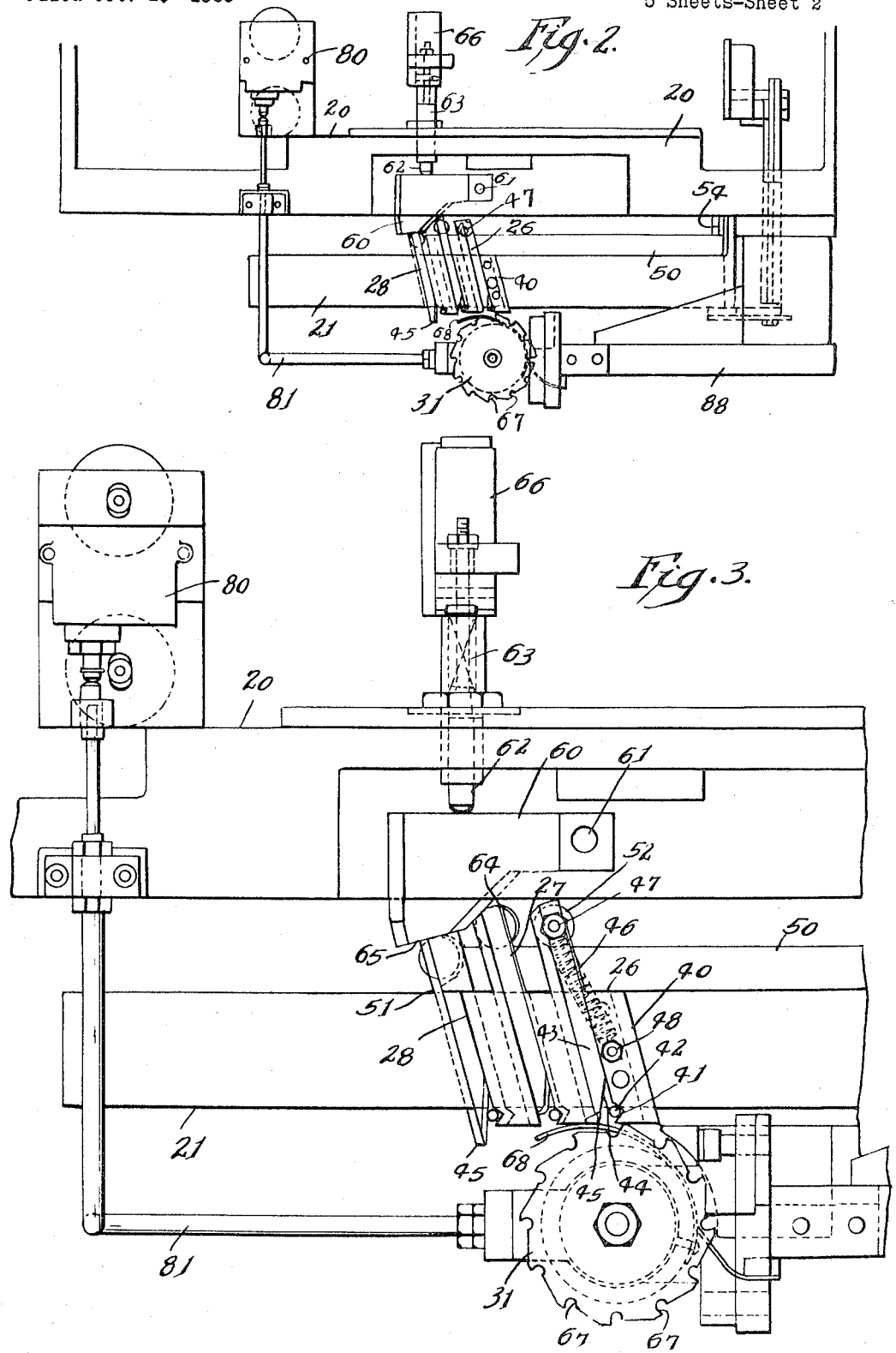

Dec. 6, 1966  C. O. LOFGREN ETAL  3,289,228
SCREW HEAD SLOTTING APPARATUS
Filed Oct. 19, 1965  5 Sheets-Sheet 3
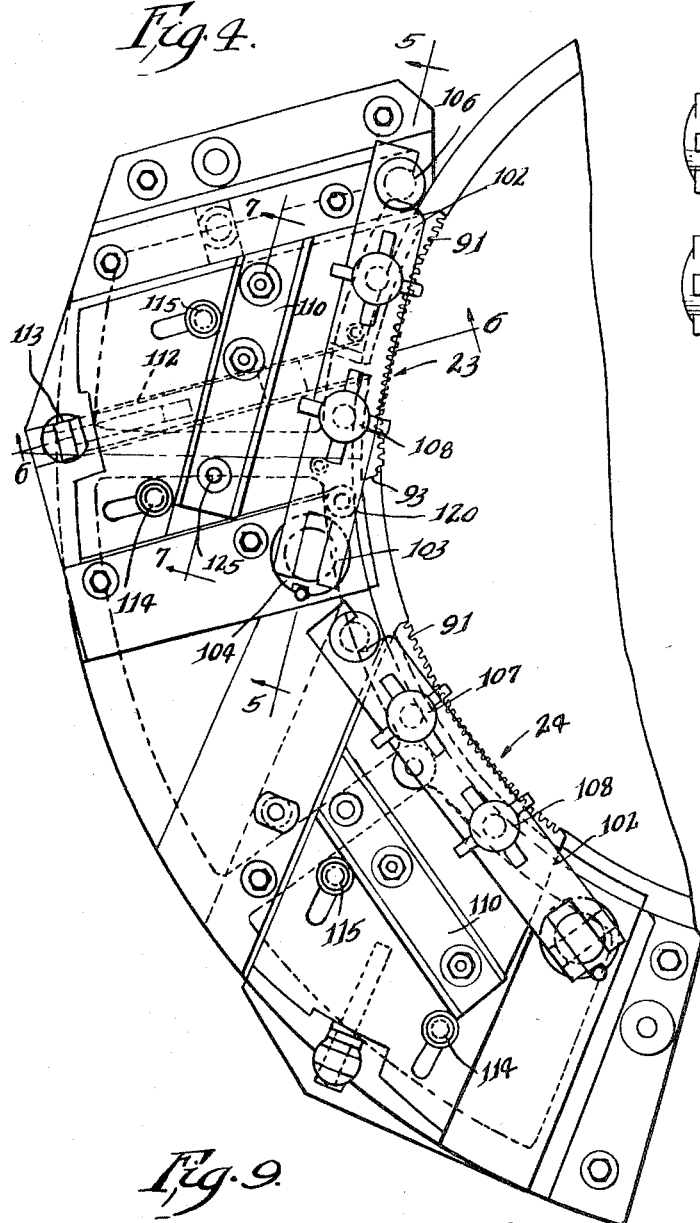
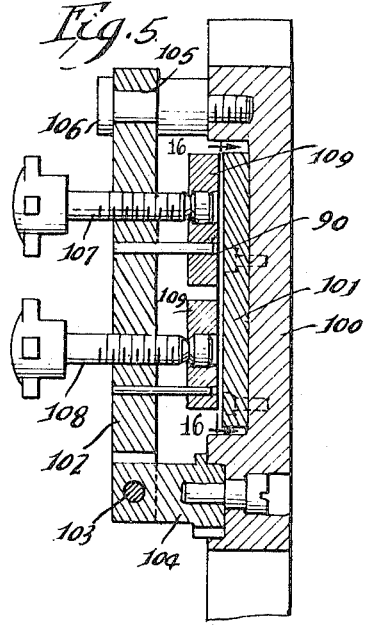
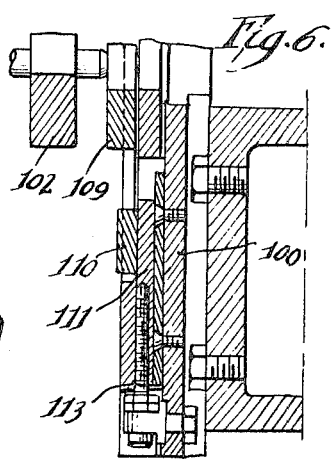
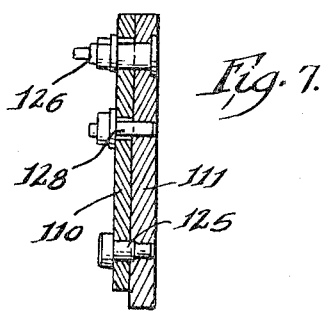
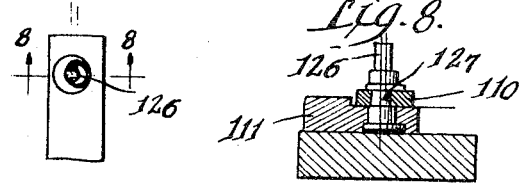

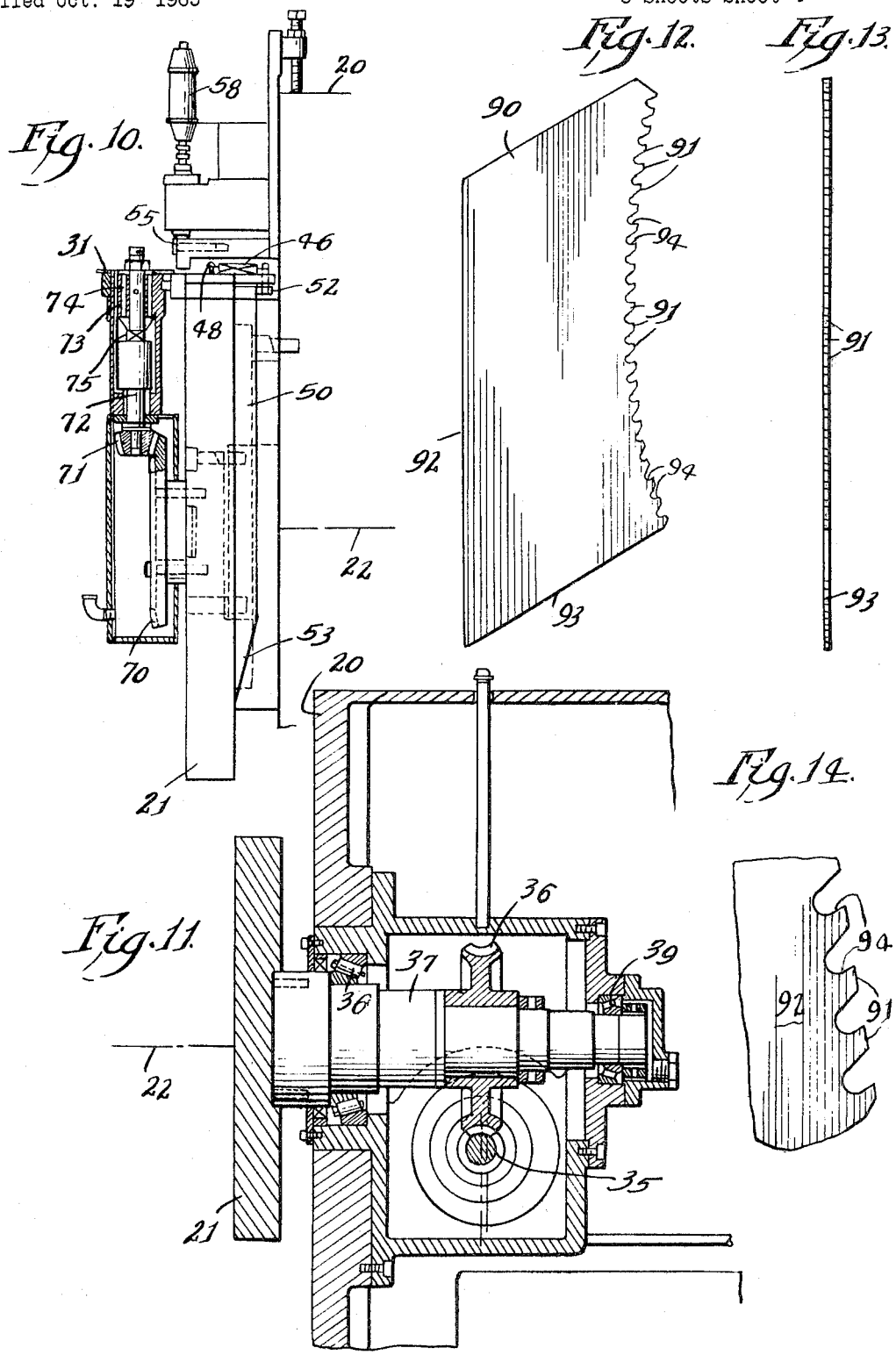

Dec. 6, 1966  C. O. LOFGREN ETAL  3,289,228
SCREW HEAD SLOTTING APPARATUS
Filed Oct. 19, 1965  5 Sheets-Sheet 5
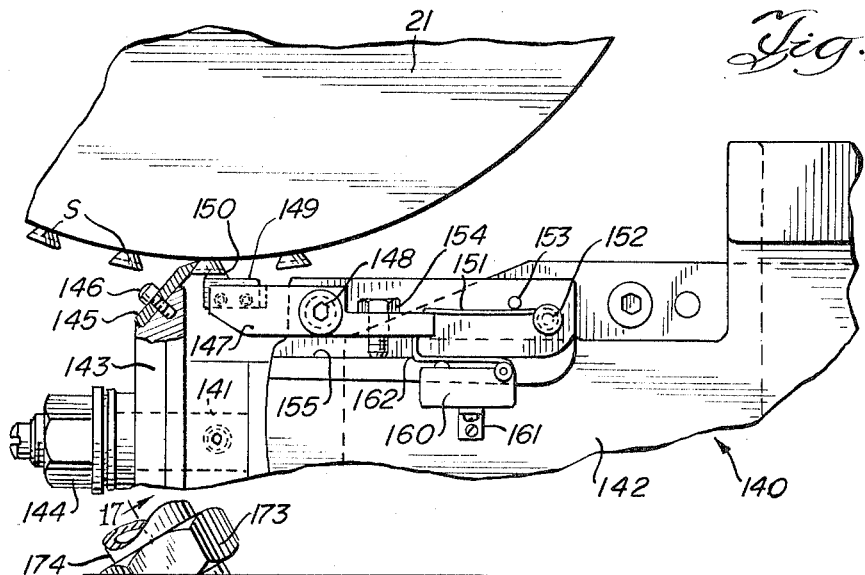
Fig. 15
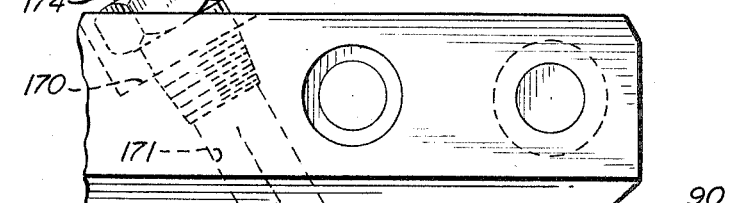
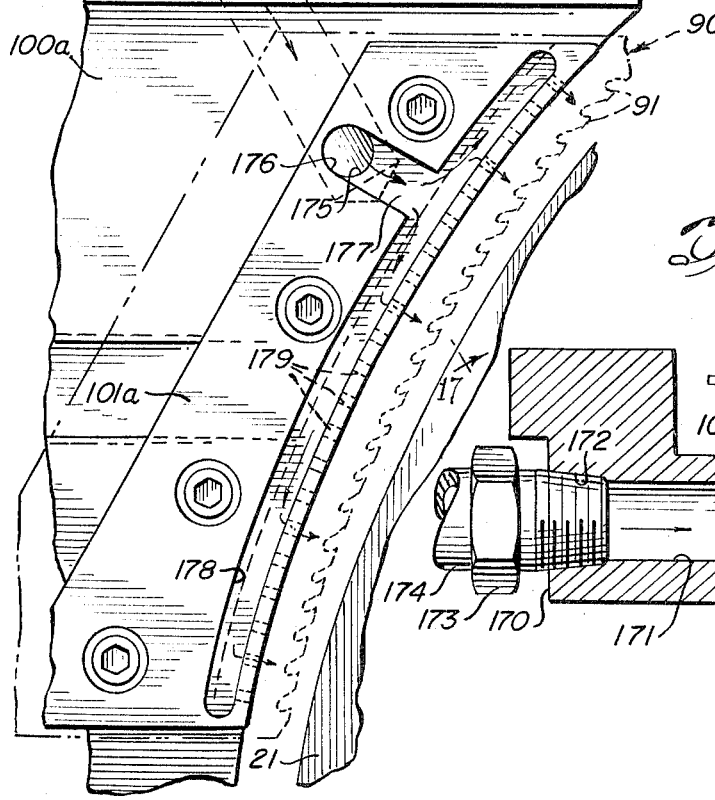
Fig. 16
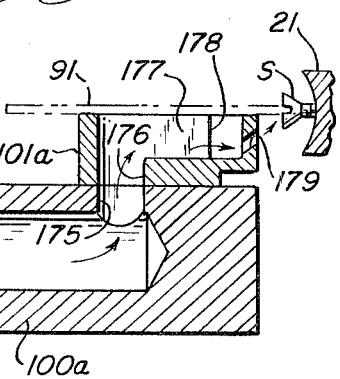
Fig. 17

United States Patent Office 3,289,228
Patented Dec. 6, 1966

3,289,228
SCREW HEAD SLOTTING APPARATUS
Charles O. Lofgren and Axel Anderson, Rockford, Ill., assignors to Sundstrand Corporation, a corporation of Illinois
Filed Oct. 19, 1965, Ser. No. 498,073
17 Claims. (Cl. 10—6)

This application is a continuation-in-part application of Lofgren et al. application Serial No. 142,088 filed October 2, 1961, having the same assignee as the present application, and now Patent No. 3,222,702.

This invention relates to a rotary broaching machine, and more particularly to a rotary broaching machine for slotting screws or the like.

In the above-mentioned application, a rotary broaching machine is disclosed which can slot several hundred screw blanks per minute. Such machine can handle several different sizes of work pieces without change in the machine, and several novel features are disclosed in the application for handling screw blanks and for operating the machine.

An object of the present invention is to provide a new and improved tool holding means for a rotary broaching machine or the like.

A further object of the invention is to provide means for quickly attaching and detaching a cutter, such as a broach or the like, to a machine tool.

Another object of the invention is to provide a tool holder with means for adjusting the cutter held thereby relative to the path of movement of the work piece.

A still further object of the invention is the provision of lubricating means in combination with tool holding means as described above, so that the lubricating means can cool the cutter teeth, and remove chips therefrom.

Still another object of the invention is to provide a screw slotting machine having means for deburring the screw slots with means for sensing an unslotted screw.

Yet another object of the present invention is to provide a screw slotting machine as described in the preceding paragraph with means for holding the screw against rotation during deburring thereof.

Further objects and advantages will become apparent from the following detailed description taken in connection with the accompanying drawings, in which:

FIGURE 2 is a plan view of the work holder structure shown in FIGURE 1;

FIGURE 3 is a view similar to FIGURE 2 on an enlarged scale;

FIGURE 4 is a fragmentary front elevational view of the broach holders shown in FIGURE 1;

FIGURE 5 is a section through a part of the broach holder and taken generally along the line 5—5 in FIGURE 4;

FIGURE 6 is a fragmentary section taken generally along the line 6—6 in FIGURE 4;

FIGURE 7 is a fragmentary section taken along the line 7—7 in FIGURE 4;

FIGURE 8 is a section taken along the line 8—8 in FIGURE 9;

FIGURE 9 is a plan view of the adjustment mechanism shown at the upper end of FIGURE 7;

FIGURE 10 is a fragmentary side elevational view of the work holding fixture shown in FIGURE 1;

FIGURE 11 is a central vertical section of the drive for the work holding fixture shown on an enlarged scale;

FIGURE 12 is a detail plan view of the blade-shaped broach;

FIGURE 13 is an end elevational view of the broach looking toward the edge having the cutting teeth;

FIGURE 14 is an enlarged fragmentary view of a portion of the cutting edge of the broach;

FIGURE 15 is an enlarged fragmentary front elevational view of the rotary broaching machine, showing the deburring and screw sensing means;

FIGURE 16 is an enlarged view taken generally as shown along line 16—16 in FIGURE 5 and illustrating a modification of the invention; and FIGURE 17 is a sectional view taken generally along line 17—17 in FIGURE 16.

Figure 1:
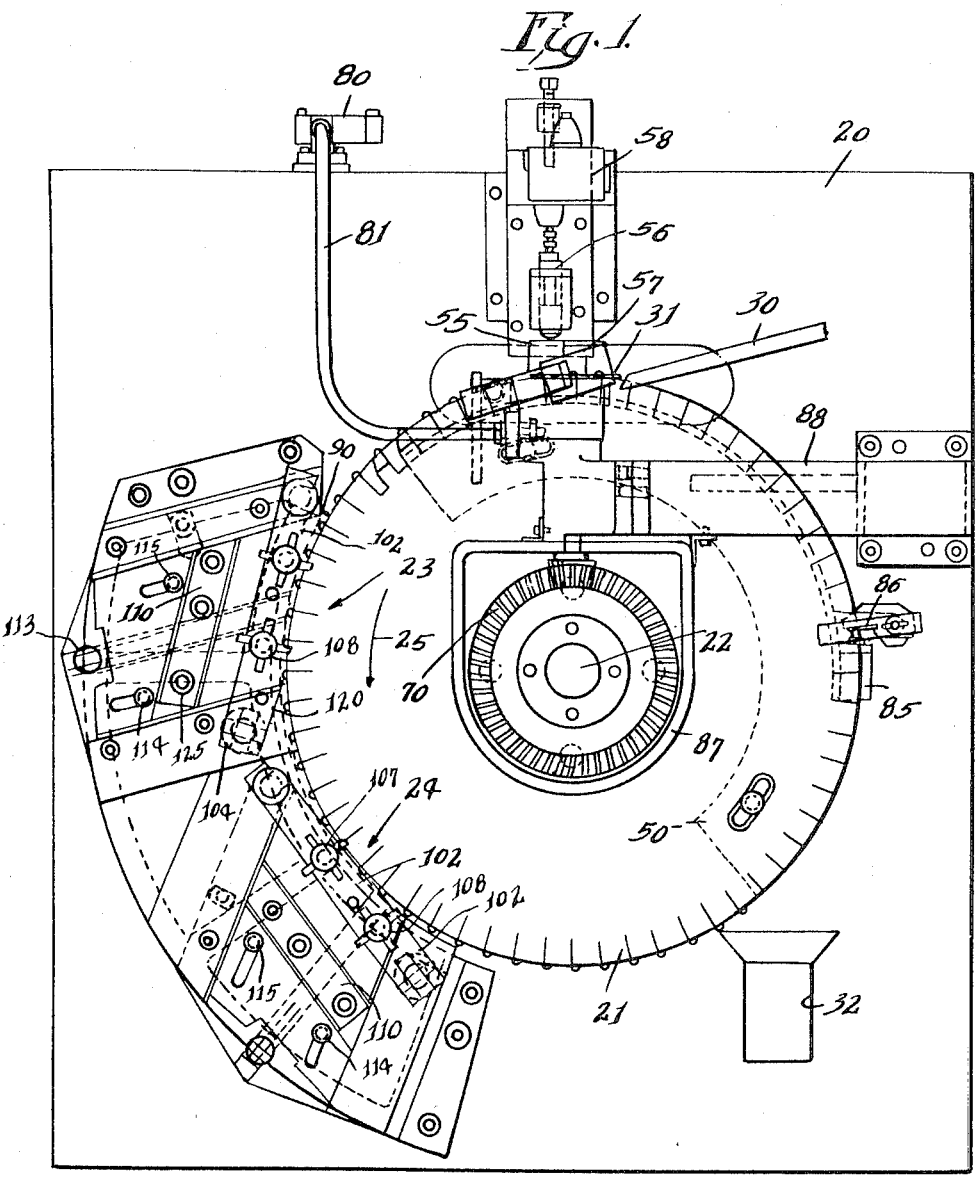
FIGURE 1 is a front elevational view of the rotary broaching machine.

While this invention is susceptible of embodiment in many different forms, there is shown in the drawings and will herein be described in detail an embodiment of the invention with the understanding that the present disclosure is to be considered as an exemplification of the principles of the invention and is not intended to limit the invention to the embodiment illustrated. The scope of the invention will be pointed out in the appended claims.

As shown generally in FIGURES 1, 2 and 3, the rotary broaching machine embodies a head 20 supported on a suitable base (not shown). The head carries a rotatable work holding device 21 which rotates on an axis 22 for carrying workpieces such as screw blanks sequentially past a first broaching station, indicated generally at 23, and a second broaching station, indicated generally at 24, with the rotation of the device 21 being shown by the arrow 25. The work holding device 21 is generally in the form of a drum having about its periphery a continuous series of individual work holders or fixtures, some of which are shown at 26, 27 and 28 in FIGURES 2 and 3, which receive screw blanks from a supply having a supply chute 30 and are placed in the holders by a feed wheel 31. By rotation of the feed wheel 31, the screw blank is delivered to one of the work holders and is clamped therein with rotation of the work holding device 21 carrying the screw blank with the head exposed out on the periphery of the device through the two broach stations. The workpiece is subsequently released from the work holding device 21 for movement into a chute 32 which leads the screw blank with the head slotted to a storage container. As will be described in more detail later, immediately preceding the chute 32 a driven deburring tool may be mounted to remove any burr obtained from formation of the slot in the screw head.

The work holding fixture 21 and the mechanism associated therewith are shown in FIGURES 1, 2, 3 and 10. The drum 21 is driven from a suitable source of power, such as an electric motor, driving a worm 35 (FIGURE 11) which drives a worm wheel 36 fixed to a shaft 37 coaxial with axis 22 and rotatably mounted in spaced bearings 38 and 39 in the head, and which has the drum 21 secured thereto.

Each of the individual work holders is of the same construction and embodies a first member 40 secured to the drum and having a V-shaped notch 41 facing generally in the direction of travel of the drum for receiving a workpiece 42, as shown in FIGURE 3. A second member 43 is movably mounted relative to the first member 40 and is slidably guided by suitable undercuts formed in the next adjacent work holder member 40 and the associated work holder member 40. The second member 43 has a sloped surface 44 tapering toward an exposed end 45 whereby as the second member 43 moves from the retracted position shown for the holder 26 in FIGURE 3 to the extended position shown in connection with holder 28 in FIGURE 3, the sloped surface progressively moves toward the notch 41 while the member 43 is actually moving lengthwise. With the construction of the V-shaped notch as well as the sloped surface 44 on the second member 43, the work holder is capable of holding screw blanks of varying diameters whereby different size blanks can be handled without any change in the set-up of the machine. The second member 43 of the work holder is yieldably urged to its extended position by a spring 46 connected between the member, as indicated at 47, and the drum, as indicated at 48. The work holder member 43 is maintained in a position to receive a workpiece by means of a stationary cam 50 located to the rear of the drum 21 and which terminates at 51, whereby a follower roller 52 on the member 43 moves off the cam to permti the spring 46 to function to extend the member to clamp a workpiece. The workpiece is held in clamped position as it passes the broaching stations 23 and 24 and when the workpiece reaches the chute 32 the cam again becomes effective with a lead-in end 53 as shown in FIGURE 10 being positioned to engage the follower roller 52 of the movable work holder member. The cam 50 is suitably secured to the frame of the machine by an attachment bracket such as indicated at 54.

There are two detection controls associated with the workpiece and the work holder, with the first of these detecting that the screw blank is properly located heightwise in the work holder. If the blank is located too high this could result in damage to the broaches. This detection is obtained by a pivoted member 55 located to be engaged by a screw located in a work holder and backed up by spring-loaded plunger 56 which is mounted for vertical movement as viewed in FIGURE 1. If a screw blank is located too high in the holder the member 55 is pivoted clockwise about a pivot 57 as viewed in FIGURE 1, to raise the plunger 56 and operate a switch 58 which is connected into the circuit for the drive motor for the machine and which, when operated, stops the motor and operates an indicator light. The second detection control obtained is to determine if a workpiece is properly clamped in the holder. This construction is shown in FIGURE 3 and embodies a member 60 pivoted at 61 and urged toward the work holders by a plunger 62 which is spring-loaded by a spring 63 engaged therewith. As will be seen in FIGURE 3, the member 60 has a first sloped surface 64 and a second sloped surface 65 which, because of the spring loading, delivers a hammer blow to the movable member 43 of the work holder to insure a tight clamped relation with a workpiece. When a movable member is given the hammer blow, the hammer member 60 is in effect driven back, and if the movable member has not moved to clamping position, the hammer member 60 will be driven back too far and the plunger 62 will indicate this position and operate the switch 66 to operate an indicator light which indicates to an operator that a part is not properly clamped and to stop the machine.

Means are associated with the camming device 21 for placing individual workpieces in the individual work holders and as shown this means comprises the feed wheel 31 which is in the form of a disc having a plurality of notches 67 about its periphery each of which can receive an individual screw blank and hold the blank therein whereby as the feed wheel rotates a screw blank in a notch 67 is delivered into a notch 41 of a work holder. Because the screw blank is headed it will seat itself and hold itself within the notches 67 which is also true with respect to the notches 41 in the work holders. Transfer of a workpiece from a feed wheel notch 67 to a work holder notch 41 is accomplished under the urging of a flexible spring member 68 as assisted by centrifugal force imparted to the workpiece during the rotation of the feed wheel.

Means are provided for driving the feed wheel 31 in timed relation to the work holding drum 21 in order that the feed wheel notches 67 will present themselves in timed relation to the individual work holders. This means comprises a gear 70 rotatable with the drum 21 which meshes with a gear 71 fixed to a shaft 72 to which the feed wheel 31 is loosely mounted. The feed wheel is driven from the shaft 72 by a clutch mechanism embodying a member 73 pinned to the shaft and having a series of pins 74 which are spring loaded upwardly into engagement with the underside of the feed wheel 31 by a spring 75 and engage in recesse son the underside of the feed wheel. If a jam occurs in the feed wheel resulting in inability of the feed wheel to rotate, the clutch pins 74 move out of the recesses on the underside of the feed wheel against the urging of the spring 75 to disengage the drive to the feed wheel. This disengagement results in operation of a switch 80 shown in FIGURES 1, 2 and 3, which switch is actuated through a motion transmitting cable 81 to operate an indicator light and stop the machine.

One additional limit switch is provided to detect the failure of a part to drop out of the work holder after broaching, with this switch being indicated at 85 in FIGURE 1 and including a pivotal feeler 86 positioned to be engaged by a part remaining in the work holding drum 21 to shift contact with the switch to stop the drive motor and operate an indicator light in the event a part remains in the drum.

The feed wheel 31 and parts associated therewith are mounted on and within a housing 87 which is supported from the frame of the machine by an arm 88.

The broaching tool is shown in FIGURES 12–14 and embodies a generally flat blade-shaped body 90 with a series of teeth 91 along one edge thereof arranged to define a curved cutting profile with the specific form being shown as an arc of a circle. The body of the blade is shaped to have a rear edge 92 and a side edge 93 arranged at an acute angle of approximately 60° and with the side edge 93 being generally parallel to a face 94 of a cutting tooth. The back edge 92 of the blade body is generally parallel to a tangent of the curved cutting profile intermediate it sends. As shown, the teeth have a positive rake angle and have a form whereby the tooth is identical after sharpening, and also the location of the teeth is maintained identically relative to broach holder locating surfaces subsequently to be described.

Each of the broaching stations 23 and 24 is basically the same, with the second station being used only to provide a depth of cut ina workpiece greater than that provided by the first station.

Each of the broach holders 23 and 24 is similar, and the broach holder 23 will be described in detail. The broach holder embodies a frame 100 with a plate 101 against which the broach 90 rests, and the broach is held within the holder by a quick release mechanism embodying an arm 102 which is pivoted at 103 to a member 104 swivelly mounted in the frame 100. The opposite end of the arm 102 has an open ended slot 105 which fits an undercut part of a pin 106 secured in the frame 100. The arm 102 carries a pair of threaded members 107 and 108, each of which has pressure pads 109 which engage the opposite face of the broach body 90. With the parts in assembled relation as shown in FIGURES 4 and 5, the turning of the members 107 and 108 causes the pads to firmly engage the broach and to hold the arm 102 in broach clamping position. When it is desired to change a broach, the members 107 and 108 are backed off, which then frees the arm 102 for rotation about the swivel 104 until the notch 105 is released from the pin 106 and then the arm 102 may be swung about the pivot 103 to move the arm out of the way for access to the broach.

The broach in effect is held in a slot with a bottom or left-hand side of the slot as viewed in FIGURE 4 being defined by a bar 110 carried on a base 111 which is adjustably mounted on the frame 100 by means of a central key 112. The adjustment of the base 111 relative to the frame 100 is obtained by the threaded member 113, and the position is maintained by a pair of tightening bolts 114 and 115 which pass through slots in the base 111 and attach to the frame 100. The key 112 is arranged at an angle of 15° to a radian from the axis of rotation 22 for the work holding drum 21. The thrust of the broaching action is taken by a member 120 having a flat surface to engage the side edge 93 of the broach tool, and this member can rotate to maintain its contact with the edge of the broach tool even though the inclination of the broach may be varied as subsequently described. The member 110 against which the rear edge 92 of the broach engages, in addition to being movable with the holder base 111, is mounted for pivotal movement about a pivot pin 125 which is on a radial line of the work holding drum axis 22 which also passes through the last tooth 91 of the broach tool. This angular adjustment permits tilting of the tool to determine the rise per tooth and with the relation along the radial line, permits this while maintaining the setting of the last tooth for final depth of cut. The angular adjustment of the member 110 is accomplished by rotation of a pin 126 having an eccentric surface 127 engageable with the member 110. The adjustment movement is permitted by loosening of a tightening bolt 128 passing through an oversize opening in the member 110, which is of a size to avoid any interference with the angular adjustment, and when the tightening bolt is tightened the member 110 is held in an adjusted position.

As stated previously, the broach holder at broach station 24 is the same as the holder at station 23 and similar reference numerals have been applied thereto.

The deburring tool mentioned above is illustrated generally at 140 in FIGURE 15, and includes a shaft 141 rotatably mounted within a suitable housing 142. A cutter head 143 is secured on shaft 141, as by lock nut 144, and at least one cutter 145 is secured to the head 143 by a screw 146. Suitable means, not shown, are provided for rotating shaft 141. Shaft 141 and cutter head 143 are disposed at an angle with respect to the center line of holding device 21, so that as the device 21 is rotated, the cutter 145 moves past the broached screw blank to remove the burr, if any present at the end of the broached slot.

Means are provided for holding the slotted screw blank S against rotation during the deburring thereof, and for sensing the presence of an unslotted screw (as might occasionally occur through some unforseen malfunction of the aforedescribed apparatus), and includes an arm or lever 147 pivotally mounted on the housing 142 by a pivot pin 148. A finger 149 is fixed to the outer end of the arm 147 adjacent the holding device 21, and a suitable feeler 150 is provided on finger 149 for reception in the broached slot of the screw blanks. The thickness of feeler 150 is preferably slightly less than the width of the broached screw slot so that the feeler is readily receivable therein, however, the feeler 150 is of sufficient thickness to effectively prevent rotation of the slotted screw blanks during the deburring thereof by the cutter 145.

Spring means are provided for positively urging the feeler 150 into the broached slot in the screw blanks, and herein a leaf spring 151 bears against the upper surface of arm 147 to urge the same in a clockwise direction so that the feeler 150 is yieldably biased toward the holding device 21. The outer end of spring 151 is retained by a shoulder screw 152 that is secured to the housing 142, and a dowel pin 153 is provided above the spring 151 to define a fiulcrum about which the spring 151 acts upon the arm 147. Adjustable stop means are provided for preventing interference between the feeler 150 and the slotted screw blanks, and includes a screw 154 threaded through a suitable opening in arm 147 and urged into engagement with a surface 155 on the housing 142 by spring 151. It will be understood that the position of the member 154 is adjusted so that the engagement thereof with surface 155 under the bias of spring 151 will position the feeler 150 to clear the end of the broached slot in the screw blanks, so that the holding device 21 can feed the screw blanks past the feeler 150 without interference.

The means for sensing the presence of an unslotted screw further includes a switch 160 suitably secured to the housing 142 as by a bracket 161. Switch 160 is operatively responsive to the position of arm 147, and may be connected in a suitable circuit for operating an indicator light and for stopping the drive motor when an unslotted screw is sensed. More particularly, switch 160 may include a pivoted switch operating member 162 which bears against the undersurface of pivoted arm 147. When the above-described broaches fail to broach the screw slots to a preselected desired depth, the feeler 150 will engage the bottom surface of the screw slot and pivot the arm 147 in a counterclockwise direction, whereupon the switch operating member 162 will pivot in a clockwise direction to operate the switch 160. Thus, the feeler 150 not only serves to positively hold the screw blanks against rotation during the deburring thereof, but also, in combination with switch 160, serves to sense the presence of an unslotted or insufficiently slotted screw blank.

Referring now to FIGURES 16 and 17, means are illustrated for lubricating and cooling broach teeth 91, and for removing chips therefrom. In the modified broach holder frame member 100a illustrated in FIGURES 16 and 17, a surface 170 is formed in the upper side of the frame 100a, and a bore 171 extends into the interior of frame 100a generally normal to the surface 170. A suitable pipe thread 172 is provided at the outer end of bore 171 for reception of fitting 173 that is connected to a source of coolant by a hose 174. A generally vertically extending cross bore 175 is provided adjacent the inner end of bore 171, and cross bore 175 is positioned in registry with a vertical bore 176 in spacer or backing plate 101a. A passage 177 in backing plate 101a extends radially outwardly from bore 176, and communicates with a narrow channel 178 that extends substantially from end to end of the backing member 101a adjacent the forward edge thereof. As is best seen in FIGURE 16, passage 178 is arcuately shaped, so as to be disposed in substantial parallelism with the teeth 91 on broach 90. A plurality of upwardly inclined passages 179 are provided at spaced points along backing member 101a in communication with channel 178. As is best seen in FIGURE 17, passages 179 are inclined so as to direct the coolant flow against the teeth 91 of the broach 90 and the slot being formed in the screw blanks. It will be understood, of course, that the hose 174 is connected to a suitable pressurized source of coolant, and that communication is had through hose 174, bore 171, cross bore 175, bore 176, passage 177, channel 178, and passages 179. It will be readily appreciated that the coolant flowing outwardly from the passage 179 will effectively cool the broach teeth 91 during the slotting of the screw blanks S, while at the same time removing chips therefrom.

We claim:

1. In a screw slotting machine, means defining a work station, means for moving screws in a path past said work station, means at said work station for slotting screws, means on said path adjacent said work station for deburring said screws, and sensing means pivotally mounted on said deburring means and having a portion positioned in said path for sensing an unslotted screw.

2. The combination defined in claim 1 including means for holding the screws duirng the deburring thereof.

3. In a screw slotting machine, means defining a work station, means for moving screws in a path past said work station, means at said work station for slotting screws, means on said path adjacent said work station for deburring the screw slot, screw holding means having a feeler associated therewith adapted to be received in the slot of a screw to hold the same against rotation during deburring, and means movably mounting said feeler for sensing unslotted screws.

4. The combination of claim 3 wherein a switch is mounted adjacent said feeler, and is adapted to be actuated by said feeler upon movement thereof.

5. In a screw slotting machine, means defining a work station, means for moving screws in a path past said work station, means at said work station for slotting screws, means on said path adjacent said work station for deburring the screw slot, a lever mounted for pivotal movement relative to said path between normal and actuated positions, a feeler on said lever and positioned to be received in the slot of a screw when said lever is in normal position to prevent relative movement between the screw and the deburring means during deburring of the slot, said feeler being adapted to move said lever to actuated position upon engagement with an unslotted screw, and switch means adjacent said lever and positioned to be actuated by said lever upon movement thereof to actuated position for indicating the presence of an unslotted screw.

6. The combination of claim 5 wherein spring means bias said lever toward normal position.

7. In a screw slotting machine, means defining a work station, means for moving screws in a path past said work station, toothed means at said work station for slotting screws, means on said path adjacent said work station for deburring said screws, sensing means movably mounted on said deburring means for sensing an unslotted screw, and means for uniformly and positively directing fluid to the teeth of said screw slotting means to cool and lubricate the same.

8. In a screw slotting machine; means defining a work station; means for moving screws in a path past said work station; a holder at said work station for holding a blade-shaped broach with teeth on an edge thereof positioned along said path; said holder including, a frame, a base adjustable along a straight line relative to the frame, means on the base defining a bottom of a slot for receiving the broach, means for angularly adjusting the bottom defining means relative to the base, and quick-release means carried on the frame for clamping the broach in said slot; means on said path adjacent said work station for deburring the screw slot; a lever mounted for pivotal movement relative to said path between normal and actuated positions; a feeler on said lever and positioned to be received in the slot of a screw when said lever is in normal position to prevent relative movement between the screw and the deburring means during deburring of the slot; said feeler being adapted to move said lever to actuated position upon engagement with an unslotted screw; and switch means adjacent said lever and positioned to be actuated by said lever upon movement thereof to actuated position for indicating the presence of an unslotted screw.

9. In a screw slotting machine; means defining a work station; means for moving screws in a path past said work station; a holder at said work station for holding a blade-shaped broach with teeth along an edge thereof adjacent said path; said holder including, a frame, a base adjustable along a straight line relative to the frame, means on the base defining a bottom of a slot for receiving the broach, means for angularly adjusting the bottom defining means relative to the base, and quick-release means carried on the frame for clamping a broach in said slot; means on said path adjacent said work station for deburring the screw slot; and means associated with said deburring means for sensing an unslotted screw.

10. In a rotary broaching machine, a holder for holding a blade-shaped broach with teeth along an edge comprising, a frame, a base adjustable along a straight line relative to the frame, means on said base defining a bottom of a slot for receiving the broach, means for angularly adjusting the bottom defining means relative to the base, and quick-release means carried on the frame for clamping a broach in said slot.

11. The combination defined in claim 10 including means for uniformly and positively directing lubricant against said broach teeth throughout the length of said broach to remove chips therefrom.

12. The combination of claim 10 wherein the teeth of said broach are disposed along the arc of a circle, and said straight line in disposed at an angle of approximately 15° with respect to a radius of said arc.

13. In a rotary broaching machine, a holder for holding a blade-shaped broach with teeth along an edge comprising, a frame, means defining a channel extending longitudinally in said frame generally parallel with said broach teeth, a plurality of passages in said frame, each passage communicating with said channel and being directed toward said broach teeth, means for circulating coolant through said channel and outwardly of said passages for lubricating said broach teeth and removing chips therefrom, a base adjustable along a straight line relative to the frame, means on said base defining a bottom of a slot for receiving the broach, means for angularly adjusting the bottom defining means relative to the base, and quick-release means carried on the frame for clamping a broach in said slot.

14. A holder for a broaching tool or the like having a rear edge and a side edge disposed at an angle with respect thereto, comprising: a carrier plate; first stop means on said carrier plate for engaging the rear edge of said tool; second stop means on said carrier plate for engaging the side edge of said tool; a tool clamping arm mounted on said carrier plate for movement into and out of a clamping position; means for positively locating said arm in clamping position; and at least one tool clamping member adjustably mounted on said arm, and adapted to engage said tool and hold the same against said carrier plate.

15. A holder as defined in claim 14 wherein means are associated with said carrier plate for adjusting said first stop means along a straight line relative to said carrier plate.

16. A holder as defined in claim 14 including means mounting said tool clamping arm for pivotal movement in a plane parallel to said carrier plate and in a plane perpendicular to said carrier plate.

17. A holder as defined in claim 14 including means for adjusting said first stop means angularly relative to said base.

References Cited by the Examiner
UNITED STATES PATENTS

| | | | |
|---|---|---|---|
| 1,998,162 | 4/1935 | Lapointe | 90—70 |
| 2,372,287 | 3/1945 | Oakes | 77—5 |
| 2,829,387 | 4/1958 | Carangelo | 10—6 |
| 2,996,734 | 8/1961 | Lange et al. | 10—6 |

ANDREW R. JUHASZ, *Primary Examiner.*